(12) United States Patent
Anwar et al.

(10) Patent No.: US 10,171,371 B2
(45) Date of Patent: Jan. 1, 2019

(54) SCALABLE METERING FOR CLOUD SERVICE MANAGEMENT BASED ON COST-AWARENESS

(71) Applicant: International Business Machines Corporation, Armonk, NY (US)

(72) Inventors: Ali Anwar, Blaksburg, VA (US); Salman A. Baset, New York, NY (US); Andrzej P. Kochut, Croton-on-Hudson, NY (US); Hui Lei, Scarsdale, NY (US); Anca Sailer, Scarsdale, NY (US); Alla Segal, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 251 days.

(21) Appl. No.: 14/871,443

(22) Filed: Sep. 30, 2015

(65) Prior Publication Data
US 2016/0094410 A1    Mar. 31, 2016

Related U.S. Application Data

(60) Provisional application No. 62/057,686, filed on Sep. 30, 2014.

(51) Int. Cl.
*G06F 15/173*    (2006.01)
*H04L 12/911*    (2013.01)
(Continued)

(52) U.S. Cl.
CPC .......... *H04L 47/70* (2013.01); *H04L 41/0893* (2013.01); *H04L 47/27* (2013.01);
(Continued)

(58) Field of Classification Search
CPC ............................. H04L 41/0893; H04L 47/27
(Continued)

(56) References Cited

U.S. PATENT DOCUMENTS 8,015,367 B1    9/2011   Rao et al.
2011/0055389 A1*   3/2011   Bley ................... G06F 11/3409
                                                           709/224

(Continued)

OTHER PUBLICATIONS

A. Anwar et al., "Anatomy of Cloud Monitoring and Metering: An OpenStack Case Study," Proceedings of the 6th Asia-Pacific Workshop on Systems (APSys), 2015, 7 pages.
(Continued)

*Primary Examiner* — Duyen M Doan
(74) *Attorney, Agent, or Firm* — Kurt Goudy; Ryan, Mason & Lewis, LLP

(57) ABSTRACT

Systems and methods are provided to support service management in cloud computing networks. For example, a method for managing a computing platform includes provisioning a plurality of virtual machines across a plurality of computing nodes of a computing platform, wherein the provisioned virtual machines are configured to execute service workloads to provide one or more services to customers, and utilizing one or more of the provisioned virtual machines which execute the service workloads to further perform service management operations for managing the computing platform. The service management operations for managing the computing platform include, e.g., mediation and rating operations for revenue management of the computing platform.

20 Claims, 9 Drawing Sheets

(51) Int. Cl.
  *H04L 29/08* (2006.01)
  *H04L 12/807* (2013.01)
  *H04L 12/24* (2006.01)
  *H04L 12/26* (2006.01)
(52) U.S. Cl.
  CPC .......... *H04L 67/10* (2013.01); *H04L 67/1029* (2013.01); *H04L 67/1095* (2013.01); *H04L 67/1097* (2013.01); *H04L 67/22* (2013.01); *H04L 41/5019* (2013.01); *H04L 43/0817* (2013.01); *H04L 43/16* (2013.01)
(58) Field of Classification Search
  USPC ........................................ 709/223, 203, 225
  See application file for complete search history.

(56) References Cited

U.S. PATENT DOCUMENTS

| | | | | |
|---|---|---|---|---|
| 2011/0083131 | A1* | 4/2011 | Pirzada | G06F 9/45533 718/1 |
| 2011/0295999 | A1* | 12/2011 | Ferris | G06F 9/5072 709/226 |
| 2012/0167081 | A1* | 6/2012 | Sedayao | G06F 11/30 718/1 |
| 2015/0052287 | A1 | 2/2015 | Venkatasubramanian et al. | |
| 2015/0120791 | A1* | 4/2015 | Gummaraju | G06F 17/30194 707/823 |
| 2015/0154039 | A1* | 6/2015 | Zada | G06F 9/5011 718/1 |
| 2016/0021024 | A1* | 1/2016 | Parikh | G06F 9/45558 709/226 |

OTHER PUBLICATIONS

IBM, "System and Method for Scalable Discovery and Monitoring of SAN Devices," ip.com, IPCOM000186557, Aug. 26, 2009, 4 pages.
Disclosed Anonymously, Method and System for Improving Storage Scalability in Workload Optimized Systems Using Workload Partitions (WPARS), Jun. 15, 2011, 5 pages.
M.J. Agarwal et al., "Problem Determination in Enterprise Middleware Systems using Change Point Correlation of Time Series Data," 10th IEEE/IFIP Network Operations and Management Symposium (NOMS), 2006, pp. 471-482.
A. Anwar et al., "Cost-Aware Cloud Metering with Scalable Service Management Infrastructure," IEEE 8th International Conference on Cloud Computing (CLOUD), Jul. 2015, pp. 258-292.
A. Anwar et al., "Scalable Metering for an Affordable IT Cloud Service Management," IEEE International Conference on Cloud Engineering (IC2E), Mar. 2015, pp. 207-212.
A. Brinkmann et al., "Scalable Monitoring Systems for Clouds," IEEE/ACM 6th International Conference on Utility and Cloud Computing (UCC), Dec. 2013, pp. 351-356.
C. Canali et al., "Automatic Virtual Machine Clustering Based on Battacharyya Distance for Multi-Cloud Systems," Proceedings of the 2013 International Workshop on Multi-Cloud Applications and Federated Clouds, Apr. 2013, pp. 45-52.
C. Chen et al., "Towards Verifiable Resource Accounting for Outsourced Computation," Proceedings of the 9th ACM SIGPLAN/SIGOPS International Conference on Virtual Execution Environments, Mar. 2013, pp. 167-178.
R. Iyer et al., "Virtual Platform Architectures for Resource Metering in Datacenters," ACM SIGMETRICS Performance Evaluation Review, Sep. 2009, pp. 89-90, vol. 27, No. 2.
X. Jiang et al., "'Out-of-the-Box' Monitoring of VM-Based High-Interaction Honeypots," Proceedings of the 10th International Conference on Recent Advanced in Intrusion Detection (RAID '07), 2007, pp. 198-218.

S. Kashyap et al., "Efficient Constraint Monitoring Using Adaptive Thresholds," IEEE 24th International Conference on Data Engineering (ICDE), Apr. 2008, pp. 526-535.
J. Lin et al., "Experiencing SAX: A Novel Symbolic Representation of Time Series," Data Mining and Knowledge Discovery, Oct. 2007, pp. 107-144, vol. 15, No. 2.
M. Liu et al., "On Trustworthiness of CPU Usage Metering and Accounting," Proceedings of the 2010 IEEE 30th International Conference on Distributed Computing Systems Workshops (ICDCSW), 2010, pp. 82-91.
S. Meng et al., "Volley: Violation Likelihood Based State Monitoring for Datacenters," 2013 IEEE 33rd International Conference on Distributed Computing Systems (ICDS), Jul. 2014, pp. 1-10.
S. Meng et al., "Reliable State Monitoring in Cloud Datacenters," 2012 IEEE Fifth International Conference on Cloud Computing (CLOUD), 2012, pp. 951-958.
W. Richter et al., "Agentless Cloud-Wide Streaming of Guest File System Updates," Proceedings of the 2014 IEEE International Conference on Cloud Engineering (IC2E), 2014, pp. 7-16.
P. Siirtola et al., "Improving the Classification Accuracy of Streaming Data Using SAX Similarity Features," Pattern Recognition Letters, Oct. 2011, pp. 1659-1668, vol. 32, No. 13.
L.M. Vaquero, "A Break in the Clouds: Towards a Cloud Definition," ACM SIGCOMM Computer Communication Review, Jan. 2009, pp. 50-55, vol. 39, No. 1.
C. Watson et al., "A Microscope on Microservices," The Netflix Tech Blog, http://techblog.netflix.com/2015/02/a-microscope-on-microservies.html, Feb. 18, 2015, 7 pages.
"About Advanced Message Queuing Protocol (AMPQ)," http://www.amqp.org/about/what, 2015, 2 pages.
"Ceilometer Quickstart," https://www.rdoproject.org/CeilometerQuickStart, 2014, 15 pages.
"Ceilometer Samples and Statistics," http://docs.openstack.org/developer/ceilometer/webapi/v2.html, 2015, 7 pages.
D. Belova et al., "Open TSBD as a Metering Storage for Open Stack Telemetry," https://groups.google.com/forum/#!topic/opentsdb/9O57MfpRXI0, Jul. 2014, 4 pages.
E. Glynn et al., "OpenStack Telemetry Rethinking Ceilometer Metric Storage with Gnocchi: Time-Series as a Service," Openstack Cloud Software, https://julien.danjou.info/talks/ceilometer-gnocchi.pdf, 2014, 24 pages.
"Welcome to the SAX (Symbolic Aggregate Approximation) Homepage!" http://www.cs.ucr.edu/~eamonn/SAX.htm, 2011, 4 pages.
"The R Project for Statistical Computing: What is R?," https://www.r-project.org/about.html, 2015, 2 pages.
"The SYSSTAT Utilities," http://sebastien.godard.pagesperso-orange.fr/, 2015, 9 pages.
"Tivoli Application Dependency Discovery Manager," http://www-03.ibm.com/software/products/en/tivoliap-plicationdependencydiscoverymanager, 2015 2 pages.
"Writing Rules for the State Correlation Engine," https://publib.boulder.ibm.com/tividd/td/tec/SC32-1234-00/en_US/HTML/ecodmst118.htm, 2015, 1 page.
List of IBM Patents or Patent Applications Treated as Related.
Jason Meyers, "Survey: Cloud Still Underutilized," http://windowsitpro.com/article/cloud-business-issues/Survey-Cloud-still-underutilized-129534, WindowsITPro, Jan. 2011, 1 page.
Ceilometerquickstart—RDO, "Ceilometer QuickStart," https://openstack.redhat.com/CeilometerQuickStart, 2014, 13 pages.
Mongodb Manual 2.6.4, "Config Servers," http://docs.mongodb.org/manual/core/sharded-cluster-config-servers/, 2014, 2 pages.
M. Armbrust et al., "A View of Cloud Computing," Communications of the ACM, Apr. 2010, pp. 50-58, vol. 53, No. 4.
M. Armbrust et al., "Above the Clouds: A Berkeley View of Cloud Computing," Electrical Engineering and Computer Sciences, University of California at Berkeley, Technical Report No. UCB/EECS-2009-28, Feb. 2009, 25 pages.
Salman A. Baset, "Open Source Cloud Technologies," Proceedings of the Third ACM Symposium on Cloud Computing (SOCC), Oct. 2012, 3 pages, Article No. 28.
A. Brinkmann et al., "Scalable Monitoring System for Clouds," IEEE/ACM 6th International Conference on Utility and Cloud Computing (UCC), Dec. 2013, pp. 351-356, Dresden, Germany.

(56) References Cited

OTHER PUBLICATIONS

R. Buyya et al., "InterCloud: Utility-Oriented Federation of Cloud Computing Environments for Scaling of Application Services," Proceedings of the 10th International Conference on Algorithms and Architectures for Parallel Processing (ICA3PP), May 2010, pp. 13-31, Busan, Korea, vol. Part I.

R. Buyya et al., "Cloud Computing and Emerging IT Platforms: Vision, Hype, and Reality for Delivering Computing as the 5th Utility," Future Generation Computer Systems, Jun. 2009, pp. 599-616, vol. 25, No. 6.

R.N. Calheiros et al., "CloudSim: A Toolkit for Modeling and Simulation of Cloud Computing Environments and Evaluation of Resource Provisioning Algorithms," Software—Practice and Experience, Jan. 2011, pp. 23-50, vol. 41, No. 1.

Rick Cattell, "Scalable SQL and NoSQL Data Stores," ACM SIGMOD Record, Dec. 2010, pp. 12-27, vol. 39, No. 4.

S. Das et al., "ElasTraS: An Elastic, Scalable, and Self Managing Transactional Database for the Cloud," ACM Transactions on Database Systems (TODS), Apr. 2013, 5 pages, vol. 38, No. 1, Article No. 5.

J. Dean et al., MapReduce: Simplified Data Processing on Large Clusters, Communications of the ACM, Jan. 2008, pp. 107-113, vol. 51, No. 1.

E. Elmroth et al., "Accounting and Billing for Federated Cloud Infrastructures," Eighth International Conference on Grid and Cooperative Computing (GCC), Aug. 2009, pp. 268-275, Lanzhou, Gansu, China.

Z. Gong et al., "Press: PRedictive Elastic ReSource Scaling for Cloud Systems," Proceedings of the 6th IEEE/IFIP International Conference on Network and Service Management (CNSM), Oct. 2010, 8 pages, Niagara Falls, Canada.

H. Goudarzi et al., "Multi-Dimensional SLA-Based Resource Allocation for Multi-Tier Cloud Computing Systems," Proceedings of the IEEE 4th International Conference on Cloud Computing (CLOUD), Jul. 2011, pp. 324-331.

Y. He et al., "RCFile: A Fast and Space-Efficient Data Placement Structure in MapReduce-Based Warehouse Systems," IEEE 27th International Conference on Data Engineering (ICDE), Apr. 2011, pp. 1199-1208, Hannover, Germany.

X. Jiang et al., ""Out-of-the-Box" Monitoring of VM-Based High-Interaction Honeypots," Proceedings of the 10th International Conference on Recent Advances in Intrusion Detection (RAID), Sep. 2007, pp. 198-218, Gold Goast, Australia.

S. Marston et al., "Cloud Computing—The Business Perspective," Decision Support Systems, Apr. 2011, pp. 176-189, vol. 51, No. 1.

P. Mell et al., "The NIST Definition of Cloud Computing," U.S. Department of Commerce, Computer Security Division, National Institute of Standards and Technology, Special Publication 800-145, Sep. 2011, 7 pages.

N. Munga et al., "The Adoption of Open Source Software in Business Models: A Red Hat and IBM Case Study," Proceedings of the Annual Research Conference of the South African Institute of Computer Scientists and Information Technologists (SAICSIT), 2009, pp. 112-121, Vaal River, Gauteng, South Africa.

D. Nurmi et al., "The Eucalyptus Open-Source Cloud-Computing System," 9th IEEE/ACM International Symposium on Cluster Computing and the Grid (CCGRID), May 2009, pp. 124-131, Shanghai, China.

W. Richter et al., "Agentless Cloud-Wide Streaming of Guest File System Updates," IEEE International Conference on Cloud Engineering (IC2E), 2014, pp. 7-16.

O. Sefraoui et al., "OpenStack: Toward an Open-Source Solution for Cloud Computing," International Journal of Computer Applications, Oct. 2012, pp. 38-42, vol. 55, No. 3.

H.N. Van et al., "SLA-Aware Virtual Resource Management for Cloud Infrastructures," Proceedings of the 9th IEEE International Conference on Computer and Information Technology (CIT), 2009, pp. 357-362, vol. 2, Xiamen, China.

L.M. Vaquero et al., "A Break in the Clouds: Towards a Cloud Definition," ACM SIGCOMM Computer Communication Review, Jan. 2009, pp. 50-55, vol. 39, No. 1.

Steve Vinoski, "Advanced Message Queuing Protocol," IEEE Internet Computing, Nov. 2006, pp. 87-89, vol. 10, No. 6.

\* cited by examiner

LOAD BALANCING METHOD
300

302:
```
function REPLACE_VM(vm, el, r)
    rl ← List of VMs sorted by usage for r
    t ← Threshold for r
    for each virtual machine uvm in inverted rl do
        ucl ← current load on uvm for r
        if ucl + el ≤ t then
            Check threshold for rest of the resources
            use_this_vm ← uvm
            break
        else
            use_this_vm ← 0
        end if
    end for
    if use_this_vm = 0 then
        use_this_vm ← launch a new virtual machine
    end if
    Transfer load from vm to use_this_vm
end function
```

304:
```
for each resource r monitored by Resource Profiler do
    rl ← List of VMs sorted by usage for r
    t ← Threshold for r
    for each virtual machine vm in rl do
        cl ← current load on vm for r
        if cl ≥ t then
            el ← cl - t
            REPLACE_VM(vm, el, r)
        else
            break
        end if
    end for
end for
```

FIG. 10

| MEDIATION | CPU | CPU% | RAM | RAM% | DIST. LINEAR SCALING | STORAGE | LICENSING COST | MGMT. COST | IT infraS. COST | VOLUME (S/M/L) |
|---|---|---|---|---|---|---|---|---|---|---|
| TECHNIQUE 1 | X | ... | ... | | | | | | | |
| TECHNIQUE 2 | Y | ... | ... | | | | | | | |
| TECHNIQUE 3 | Z | ... | ... | | | | | | | |

| RATING | CPU | CPU% | RAM | RAM% | DIST. LINEAR SCALING | STORAGE | LICENSING COST | MGMT. COST | IT infraS. COST | VOLUME (S/M/L) |
|---|---|---|---|---|---|---|---|---|---|---|
| TECHNIQUE 1 | X | ... | ... | | | | | | | |
| TECHNIQUE 2 | Y | ... | ... | | | | | | | |
| TECHNIQUE 3 | Z | ... | ... | | | | | | | |

*FIG. 11*

|  | METERS | MONTHLY | WEEKLY | DAILY | HOURLY |
|---|---|---|---|---|---|
| IaaS | $/CPU<br>$/RAM<br>$/NW<br>⋮ | COST-11 | COST-12 | ... | ... |
| PaaS | $/db2 TRANS.<br>$/db2 VOL.<br>⋮ | COST-21 | COST-22 | ... | ... |
| SaaS | $/# OF PATCH<br>$/MONITOR RES.<br>⋮ | COST-31 | COST-32 | ... | ... |

SCALABLE METERING FOR CLOUD SERVICE MANAGEMENT BASED ON COST-AWARENESS

CROSS-REFERENCE TO RELATED APPLICATION

This application claims priority to U.S. Provisional Application Ser. No. 62/057,686, filed on Sep. 30, 2014, the disclosure of which is incorporated herein by reference.

TECHNICAL FIELD

The field generally relates to network computing and, in particular, to systems and methods for service management of cloud computing networks.

BACKGROUND

The cloud computing model has emerged as the de facto paradigm for providing a wide range of services in the IT industry such as infrastructure, platform, and application services. As a result, various vendors offer cloud based solutions to optimize the use of their data centers. A key enabler for cloud computing is resource virtualization, which enables provisioning of multiple virtual machines (VMs) to provide a service, or a plurality of disparate services, on the same physical host. In addition, resource virtualization provides benefits such as efficiency, resource consolidation, security, provides support for Service Level Agreements (SLAs), and allows for efficient scaling of services that are provided by a cloud computing platform. Resource virtualization, however, raises several issues.

For example, customers of the cloud providers, particularly those building their critical production businesses on cloud services, are interested in collecting and logging detailed monitoring data from the deployed cloud platform to track in real time the health of their thousands of service instances executing on the cloud platform. In this regard, a crucial challenge, especially for a sustainable IT business model, is how to adapt cloud service management, and implicitly its cost (e.g., impact of associated monitoring overhead) to dynamically accommodate changes in service requirements and data centers.

Furthermore, as cloud services journey through their lifecycle towards commodities, cloud computing service providers are faced with market demands for charge models that are based on fine-grained pay-per-use pricing, where customers are charged for the amount of specific resources, e.g., volume of transactions, CPU usage, etc., consumed during a given time period. This is in contrast to historical coarse-grained charge models where cloud service providers charge their customers only on a flat-rate basis, e.g., in the form of a monthly subscription fee. Although this pricing methodology is straight forward and involves little management and performance overhead for the cloud service providers, it does not offer the competitive advantage edge of the usage based pricing. As a particular technology or service becomes more of a commodity (e.g., IaaS (Infrastructure as a Service), or SaaS (Software as a Service)), customers are interested in fine-grained pricing models based on their actual usage. For instance, from the perspective of a SaaS customer, it is more advantageous to be charged based on the usage of the platform (e.g., the number of http transactions or volume of the database queries) instead of a fixed monthly fee, especially when the usage is low.

In this regard, cloud service providers, looking to maintain a competitive advantage by effectively adapting to versatile charging policies, have started to promote pay-per-use. However, usage based pricing brings a new set of service management requirements for the service providers, particularly for their revenue management. The finer-grain metering for usage based pricing requires the system to monitor service resources and applications at appropriate levels to acquire useful information about the resource consumption that is to be charged for. This may result in collecting significantly large amounts of metered data. In addition, computational resources are needed to process the metered data to perform revenue management specific tasks.

The resource capacity requirements for non-revenue generating systems such as monitoring and metering fluctuate largely with, e.g., service demand (e.g., the number of service instances), service price policy updates (e.g., from single metric based charge to complex multi-metric based charge), the resolution of the system behavior exposed (e.g., from higher-level aggregations to individual runaway thread), while their unit cost changes depending on the operational infrastructure solution (e.g., on premise, traditional outsourcing or IaaS). Therefore, a crucial challenge for cloud service providers is how to manage and control service management data and functions, and implicitly the costs of such service management data and functions, in order to profitably remain in the race for the cloud market.

SUMMARY

Embodiments of the invention include systems and methods to support service management in cloud computing networks. For example, one embodiment includes a method for managing a computing platform. The method includes provisioning a plurality of virtual machines across a plurality of computing nodes of a computing platform, wherein the provisioned virtual machines are configured to execute service workloads to provide one or more services to customers, and utilizing one or more of the provisioned virtual machines which execute the service workloads to further perform service management operations for managing the computing platform. In one embodiment, the service management functions for managing the computing platform include mediation and rating operations for revenue management of the computing platform.

These and other embodiments of the invention will be described in the following detailed description of embodiments, which is to be read in conjunction with the accompanying drawings.

DESCRIPTION OF THE DRAWINGS

FIG. 3 shows pseudo code of a load balancing method according to an embodiment of the invention.

FIG. 10 illustrates profile information that is used to determine resource requirements for mediation and rating methods, according to an embodiment of the invention.

FIG. 11 illustrates a method for maximizing profit according to an embodiment of the invention.

DETAILED DESCRIPTION

Figure 1:
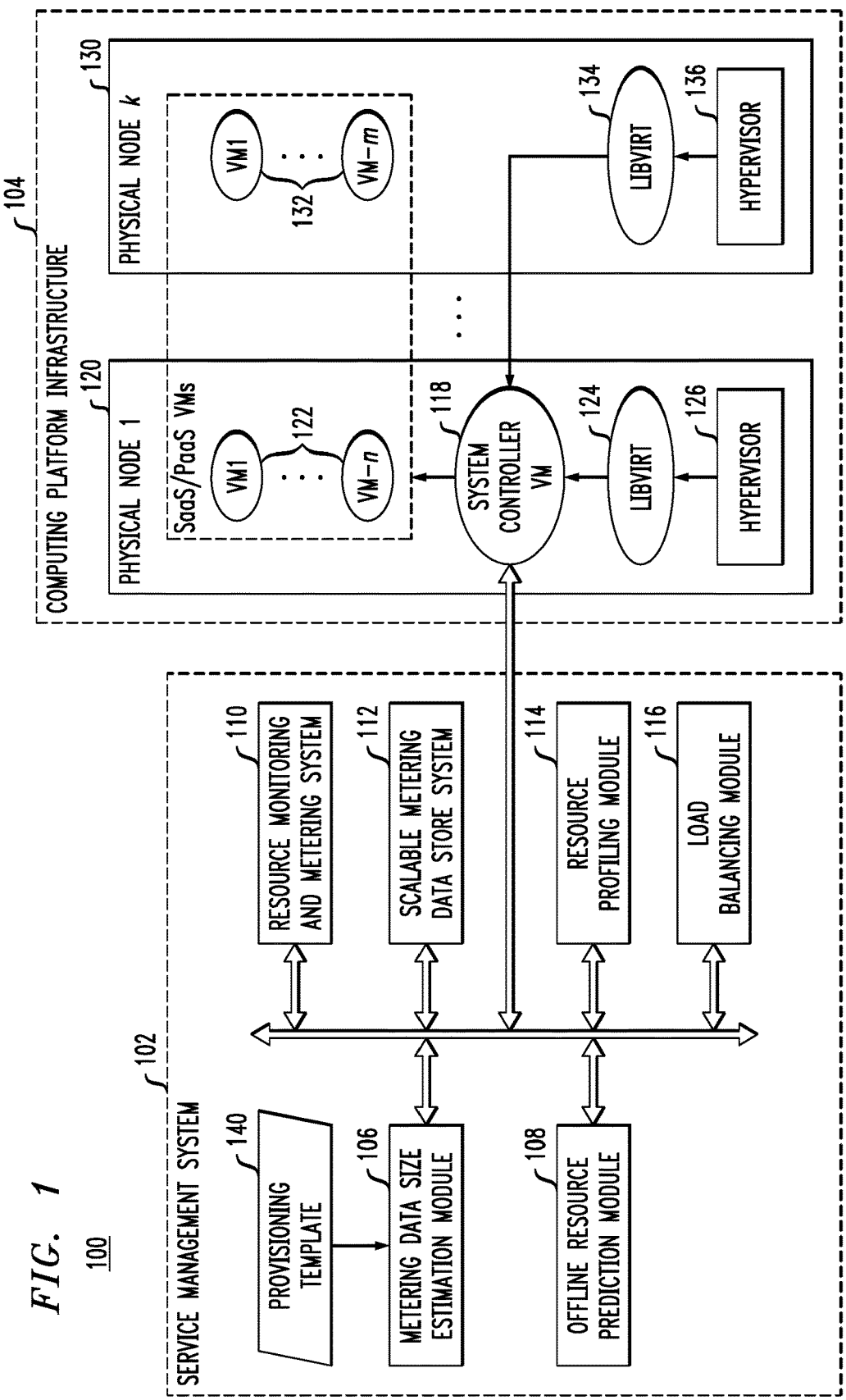
FIG. 1 illustrates a computing platform which implements a scalable service management system, according to an embodiment of the invention.

Embodiments of the invention include systems and methods to support service management in cloud computing networks. In particular, systems and methods are provided to support service management operations, such as metering, mediation, and/or rating operations for revenue management and their adaptability to business and operational changes. Embodiments of the invention include frameworks that enable cloud service providers to scale their revenue systems in a cost-aware manner, wherein existing or newly provisioned SaaS virtual machines are dynamically provisioned/utilized (instead of dedicated setups) to deploy service management systems (e.g., revenue management). For the onboarding of new customers, a framework according to an embodiment of the invention is configured to perform an off-line analysis to recommend appropriate revenue tools and their scalable distribution by predicting the need for resources based on historical usage. At runtime, the framework employs an innovative load balancing protocol to fine tune the resource distribution based on the real computation usage and the workload demand of customers.

As noted above, usage based pricing policies bring a new set of service management requirements for service providers, particularly for their revenue management. For example, usage based pricing requires the collection of significant metered data and techniques for rating according to a detailed price plans. As such, usage based pricing required finer-grain metering, which may impact the performance of resources. This is due to the fact that service resources and applications need to be monitored at the appropriate level to collect enough management data to determine the usage which has to be charged for, which may result in collecting a large amount of management data. Furthermore, the service management data (e.g., metering data) needs to be processed in order to perform: (1) mediation functions, i.e., transformation of metered data into the desired units of measure expected by the usage price policy, e.g., average, maximum or minimum usage; (2) rating functions based on the price policy for generating customer invoices, e.g., multiplying usage by per unit rate; and (3) calculations required to answer customers' queries regarding usage, e.g., variance in usage. Hence, additional resources are required not only to store service management data, but also to process service management data to support finer-grained service management.

In this regard, cloud service providers that align their services price plan to usage based pricing have to carefully choose the metering, mediation, and rating tools and infrastructure to minimize the cost of the resource requirements for performing them. Thus, a first step in performing this cost benefit analysis is to accurately estimate the cost associated with monitoring, storing, and processing the management data for the various metering and rating tools. The cost of fine grained monitoring depends on the volume of management data that is collected for the purpose of, e.g., metering. The current practice is to use a system setup for collecting management data (e.g., metering data for pricing) which is separate from, and in addition to, a cloud health monitoring setup which collects management data that provides information with regard to, e.g., performance and availability of resources and resource usage contention. The extra resources used for such revenue management place additional burden on the cloud service provider. In contrast, embodiments of the invention implement methods to consolidate metering for multiple purposes and avoid collecting of the same data by multiple agents, and to efficiently collect and estimate the volume of metering data.

A fine-grain pricing model necessitates dynamic modification of price plans offered to customers based on the market demand. In this context, a key challenge is how to provide a scalable metering framework which can adapt to price policy updates and changing loads in a data center, while minimizing the additional resources, performance impact, and interference that may result from the metering, so as to avoid a toll on the business outcome. Since the selection of different pricing policies results in different sizes of collected metering data, the system setup is expected to store and process metering data of varying size without wasting resources. Typically, cloud service providers use a dedicated set of VMs for their service management, which they manually expand based on the increasing load in their data centers. Depending on the cloud service type, for instance SaaS, cloud service providers may themselves be customers of an IaaS or PaaS (Platform as a Service). As such, they are charged for this dedicated set of VMs. This infrastructure cost is additional to the cost of the tools (e.g., for license per volume, maintenance etc.). The goal is to minimize the footprint of this nonrevenue-generating infrastructure, thus minimizing service management infrastructure cost, or ideally eliminating such cost.

In general, embodiments of the invention provide a framework for addressing metering and rating operations of revenue service management and the adaptability thereof to price policies and operational changes. For example, as explained in further detail below, embodiments of the invention implement various systems and methodologies to (i) provide an effective mechanism to accurately estimate the size of service management data (e.g., metering data) generated by a telemetry tool in response to resource provisioning requests; (ii) provide an auto-scalable data storage system for storing management data; (iii) provide an effective mechanism to track, record and analyze behavior of existing instances in an observed cluster deployed within a cloud computing system; (iv) provide an offline prediction system to predict resources that would be required to perform service management functions (such as metering, mediation, rating, etc.) and further refine or otherwise fine tune the service management via a runtime load balancer; and to (v) provide a framework to optimally utilize existing or newly provisioned VM instances to perform such service management functions. These systems and methodologies will be discussed in further detail below with reference to FIG. 1, which illustrates overall architecture implementing such features and constituent system components and their interactions.

For illustrative purposes, embodiments of the invention will be described in the context of known enabling technologies such as the well-established cloud ecosystem of OpenStack, which is an open source project that provides a massively scalable cloud operating system. OpenStack adopts a modular design and has become the de facto cloud computing platform for managing large pools of compute, storage, and networking resources in modern data centers. The platform supports a management dashboard that gives administrators control over the resources, while empowering users to provision resources through a flexible web interface. Another goal of the OpenStack project is to build an open-source community of researchers, developers and enterprises. Currently, more than 200 companies such as IBM, Cisco, Oracle, and RedHat, are participating in the project. This allows embodiments of the invention to be quickly adapted in real enterprises. There are currently more than sixteen official modules, each providing a unique functionality, supported by OpenStack. In the following, we briefly describe some of these modules, which can be used to implement embodiments of a cloud computing platform according to the invention:

Nova: provides on-demand computing resources by provisioning and managing VMs using available hypervisors.

Neutron: is a pluggable and scalable system for managing networks and IP addresses within the OpenStack ecosystem.

Cinder: is a storage as a service for applications, and maps block devices, from a variety of storage solutions, to OpenStack compute instances.

Ceilometer: is a telemetry service for monitoring and metering resources and services of a cloud computing platform.

Heat: is a service to orchestrate multiple composite cloud applications. It employs the format of Amazon Web Services CloudFormation template.

Swift: implements an API-accessible storage platform that can be integrated directly into cloud based applications, or can also be used just for backup, archiving, and data retention.

Glance: maintains a list of bootable disk images and supports a service for storing and retrieving such images.

Horizon: provides both administrators and users with a graphical interface to: i) provision and access the cloud based resources; and ii) access services such as billing, monitoring, and any available management tools.

FIG. 1 illustrates a computing platform which implements a scalable service management system, according to an embodiment of the invention. In particular, FIG. 1 illustrates a cloud computing platform 100 comprising a service management system 102 and a computing platform infrastructure 104 (e.g., data center). The service management system 102 comprises a metering data size data estimation module 106, an offline resource prediction module 108, a resource monitoring and metering module 110, a scalable metering data store system 112, a resource profiling module 114, and a load balancing module 116. The constituent components of the service management system 102 communicate with a system controller 118. In one embodiment, the system controller 118 is implemented using a dedicated virtual machine that operates on one or more computing nodes of the computing platform infrastructure 104.

The computing platform infrastructure 104 comprises a plurality of computing nodes 120 and 130, which represent different physical machines (e.g., server computers) that are part of a data center, for example. For ease of illustration, FIG. 1 depicts two computing nodes 120, 130, although the system 100 can include a plurality (k) of different computing nodes (wherein k is in the order of hundreds or thousands, for example). The computing node 120 comprises a plurality (n) of virtual machines 122, and an associated virtualization API 124 (LibVirt) and hypervisor 126. Similarly, the computing node 130 comprises a plurality (m) of virtual machines 132, and an associated virtualization API 134 and hypervisor 136. As depicted in FIG. 1, the system controller 118 is a dedicated virtual machine that executes on the computing node 120.

In one embodiment, the hypervisors 126 and 136 are virtual machine monitors comprised of software, firmware and/or hardware, which create and run the virtual machines 122 and 132 (guest operating systems) on the respective host nodes 120 and 130. The hypervisors 126 and 136 provide the respect set of virtual machines 122 and 132 with a virtual operating platform, and manage the execution of the respective virtual machines 122 and 132. The hypervisors 126 and 136 allow the virtual machines 122 and 132 to share the processor, memory and other resources of their respective host node 120 and 130. The hypervisors 126 and 136 control the host processor and resources, allocating what is needed to the respective set of virtual machines 122 and 132 while ensuring the virtual machines do not disrupt each other. The LibVirt modules 124 and 134 are virtualization APIs (or libraries), which provide hypervisor-agnostic APIs to securely manage the respective virtual machines 122 and 132 running on the respective host nodes 120 and 130. The LibVirt modules 124 and 134 each provide a common API for common functionality implemented by the hypervisors 126 and 136.

The resource monitoring and metering system 110 is configured to provide a telemetry service for monitoring and metering resources and services provided by the cloud computing platform 100. In one embodiment of the invention, the resource monitoring and metering system 100 is implemented using OpenStack's Ceilometer telemetry service, which provides an infrastructure to collect detailed measurements about resources managed by a cloud ecosystem implemented using OpenStack. In general, the main components of Ceilometer can be divided into two categories, namely agents (e.g., compute agents, central agents, etc.), and services (e.g., collector service, API service, etc.). The compute agents poll the local LibVirt modules 124, 134 (daemons) to fetch resource utilization of the currently launched virtual machines 122 and 132 and transmit the resource utilization data as AMQP (Advanced Message Queuing Protocol) notifications on a message bus (Ceilometer bus). Similarly, central agents poll public RESTful APIs of OpenStack services, such as Cinder and Glance, to track resources and emit the resource data onto OpenStack's common message bus (called Notification bus). On the other hand, a collector service collects the AMQP notifications from the agents and other OpenStack services, and dispatches the collected information to a metering database. The API service presents aggregated metering data to a billing engine.

In Ceilometer, resource usage measurements, e.g., CPU utilization, Disk Read Bytes, etc., are performed by meters or counters. Typically, there exists a meter for each resource being tracked, and there is a separate meter for each instance of the resource. The lifetime of a meter is decoupled from the associated resource, and a meter continues to exist even after the resource it was tracking has been terminated. Each data item collected by a meter is referred to as a "sample," and each sample comprises a timestamp to mark the time of collected data, and a volume that records the value. Ceilometer also allows service providers to write their own meters. Such customized meters can be designed to conveniently collect data from inside launched virtual machines, which (for a solution or software) allows cloud service providers to track application usage as well. In Ceilometer, a polling interval between two events is specified in a pipeline.yaml file, and the polling interval can be adjusted according to the cloud provider requirements. Furthermore, a collector can store the metering data in any kind of database. The size of collected data is expected to be large, so by default, Ceilometer utilizes a database such as Mongo DB for this purpose.

In the embodiment of FIG. 1, the system controller 118 is configured to operate as a data collector for the telemetry service implemented by the resource monitoring and metering system 110. In this regard, the system controller 118 serves as a centralized agent that polls each of the LibVirt modules 124 and 134 across the computing nodes 120 and 130 to obtain resource utilization data and track resources of all the virtual machines 122 and 132 across the compute nodes 120 and 130. This eliminates the need of implementing dedicated agents on each computing node 120 and 130. However, in other embodiments of the invention, dedicated agents (e.g., metering agents) can implemented on each computing node 120 and 130.

The scalable metering data store system 112 is configured to provide an auto-scalable metering store framework to support mediation and rating functions. The metering related data that is collected and by the resource monitoring and metering system 110 is stored in a metering store (e.g., database system) using the scalable metering data store system 112. In a cloud ecosystem, there is typically a vast amount, and continually growing volume of metering data. As such, it is desirable to implement a data store (e.g., database) setup which is scalable and efficient, and which can handle complex queries in a timely fashion. In this context, billing methods that implement fine-grained pricing plans require high-frequency querying of the metering data store.

In one embodiment of the invention, the scalable metering data store system 112 is implemented using the known MongoDB data store system. In particular, in one embodiment of the invention, an auto-scalable setup is implemented for MongoDB to act as the metering store for Ceilometer, wherein the auto-scalable setup is instantiated on the same set of VMs that are used to provide SaaS (as VMs to support typical SaaS workloads have been observed to not be fully utilized). OpenStack allows integration of multiple databases with Ceilometer for the purpose of storing metering data, e.g., MySQL, MongoDB, etc. MongoDB is a preferred database system for implementation in OpenStack because of features such as flexibility and allowing the structure of documents in a collection to be changed over time. In the following, we discuss MongoDB and various features that enable scaling of the metering data storage system.

As is known in the art, MongoDB is a cross platform document-oriented NoSQL (non SQL or non-relational) database. MongoDB eschews the traditional table-based relational database structure in favor of JSON-like documents with dynamic schemas, making the integration of metering data easier and faster. MongoDB offers several key features of sharding and replication, which make it a preferred system to implement an auto-scalable metering data storage system according to an embodiment of the invention.

Sharding is a method of storing data across multiple machines (shards) to support deployments with very large datasets and high throughput operations. Sharding helps in realizing scalable setups for storing metering data because the data collected by Ceilometer is expected to increase linearly over time. This is especially true for production servers. A sharded setup of MongoDB comprises three main components as follows:

Shards: store the data. Increasing the number of shards reduces the amount of data each machine in a setup needs to hold. As a result a setup can increase capacity and throughput horizontally.

Query Routers: or "Mongo instances" interface with the querying application and direct operations to appropriate shard or shards.

Config Servers: store the cluster's metadata, e.g., mapping of the cluster's dataset to shards, which is then used to target operations to specific shards. For example, an existing practice in production setups is to have three Config servers.

Replication is a feature that allows multiple machines to share the same data. Unlike sharding, replication is mainly used to ensure data redundancy and facilitate load balancing. In addition, MongoDB supports the use of the MapReduce framework for batch processing of data and aggregation options.

A first step in realizing an auto-scalable metering data storage system (based on, e.g., MongoDB) according to an embodiment of the invention is to determine when scaling is needed. For this purpose, several kinds of metrics can be utilized: (i) OS-level metrics, e.g., CPU, memory, disk usage, etc., and (ii) MongoDB performance statistics, e.g., query time, writes/s, reqs/s, etc. Since the MongoDB instances are running on the same virtual machines as those virtual machines providing user services, the virtual machines are already being monitored and thus the monitoring data can be reused to determine the OS-level information needed for this purpose as well. This information, coupled with periodically collected MongoDB statistics, is then used to determine if the metering store is loaded beyond a pre-specified high threshold or below a low threshold, and scaling decisions are made accordingly.

A next step in realizing an auto-scalable database system is to enable scaling of the metering store. For this purpose, in one embodiment of the invention, our framework exploits creation of additional MongoDB replica sets. These replica sets are added as shards to achieve further partitioning of data, which in turn support the scalability of the storage system. A design decision while performing sharding is to carefully choose the sharding key. To this end, we keep track of the speedup achieved with various sharding keys and choose the best option. It is to be noted that replication and sharding are not mutually exclusive features, and can be scaled individually based on the monitored reads/s or writes/s throughput observed through a MongoDB performance monitor.

The metering data size estimation module 106 is configured to calculate an expected change in the size of metering data. For this purpose, the metering data size estimation module 106 uses resource information obtained from a provisioning template file 140 (e.g., a Heat template file) of a given provisioning request, and determines a set of meters that are required to perform the necessary monitoring and metering. Next, the expected total number of metering events on various polling intervals is calculated along with the average event object size. The number of events are calculated by, e.g., parsing the pipeline.yaml file to fetch the sampling frequency of each meter. The average object event size is variable and depends on the type of meters launched and their sampling frequency or polling interval. To this end, the metering data size estimation module 106 keeps track of the changes in the event object size per meter and estimates the value by taking the average of n previously collected values (e.g., n=3). The metering data size estimation module 106 then averages these values across the meters to determine the overall average object size.

An alternative approach is to directly track the overall average object event size from the database of the scalable metering data store system 112. The following is an example of a sample collected from the scalable metering data store system 112 to measure an overall average object size.

```
> db.stats()
{
    "db":"ceilometer",
    "collections":6,
    "objects":2239713,
    "avgObjSize":1189.759382,
    "dataSize":2664719556,
    "storageSize":3217911760,
    ...
}
```

In this example, the expected size of metering data (2664719556 bytes) is determined by multiplying the number of event objects (2239713) with the average event object size (1189.759382 bytes).

In general, the resource profiling module 114 is configured to track resource utilization of each of the virtual machines 122 and 132. As noted above, the resource monitoring and metering module 110 launches various meters for monitoring and metering the usage of different resources per virtual machine, e.g., CPU, memory, storage, networking, etc. The resource profiling module 114 intercepts such resource usage information at the scalable metering data store system 112, and uses the resource usage information to track the per-VM resource utilization. A challenge is that the collected metering data only gives an instantaneous view of a VM's resource usage at a particular time instance, and does not necessarily portray the overall usage. To address this, in one embodiment of the invention, the resource profiling module 114 is configured to use a sliding window across a previous number (n) of metering samples to calculate a moving average, wherein the moving average is utilized as an estimate of the current per-VM resource utilization. An alternate approached to intercepting the data is to query the metering store 112 for overall utilization. However, the querying approach could burden the database and impact overall efficiency. The resource profiling module 114 also maintains queues of resources sorted based on estimated utilization. This information can be used to determine free resources within each VM, which in turn supports effective scaling of the metering setup.

The offline resource prediction module 108 is configured to analyze the data collected by the resource profiling module 114 and provide an approximate estimate of the resources that would be required for the associated metering setup. A possible trade-off that should be considered in the estimation of needed resources is whether to use less revenue management resources at the expense of performance degradation in terms of average time taken to process the collected metering data. In one embodiment, system managers are allowed to manage this trade-off by specifying the expected processing query time, query rate, and average load on the system setup, as an input to the offline resource prediction module 108. Based on the provided input, the offline resource prediction module 108 outputs a recommended setup to achieve an effective estimate for driving decision of system implementation.

The load balancing module 116 is implemented to ensure that service level agreements are met. The selection of virtual machines for launching replicas to scale-up the metering data store system 112 is an important consideration, as the additional load may affect the performance of a virtual machine. This can lead to a point where the virtual machine can no longer provide sufficient performance for the provided SaaS. Typically, cloud service providers are bound to ensure that certain service level agreements are met. Thus, the service provider may have to mitigate or launch additional resources in the face of a potential threat of a service level agreement violation. To avoid this, an embodiment of the invention utilizes a load balancer that actively tracks the infrastructure utilization of each virtual machine by coordinating with the resource profiling module 114. If resource utilization on any virtual machine exceeds a certain threshold, some or all of the workload (e.g., mediation and/or rating) from the overloaded virtual machine is either transferred to an existing virtual machine with a lower load or a new virtual machine is launched to handle the overload. The load balancing module 116 utilizes a load balancing process (as will be discussed below with referent to FIG. 3) to move shards or replica sets.

In one embodiment of the invention, the load balancing module 116 is implemented using an internal load balancer of MongoDB, which upon the creation of a new shard, transfers chunks of 64 MB of data from other machines to the newly created/added shard to evenly distribute the total number of chunks.

In one embodiment of the invention, a predefined threshold value is selected for triggering load balancing. The threshold is set so as to ensure that each resource per VM is not over-utilized by the metering framework to an extent where the performance of the provided SaaS is affected. Since the nature of service level agreements vary with the type of SaaS, as well as resource types and configurations, the predefined threshold for triggering load balancing is not fixed. Instead, such threshold varies from solution to solution and resource managers can evaluate and determine the threshold values as appropriate.

The system controller 118 is configured to control and fine-tune the scalable metering data store system 112, the resource profiling system 114 and the load balancing module 116. The system controller 118 also serves as a facilitator for the various module operations by providing access to the collected data. As noted above, in one embodiment of the invention, the system controller 118 is run in a dedicated virtual machine on a given computing node (e.g., node 120 in FIG. 1) to ensure that it is not affected by the performance and workload dynamics of the resources. By default, OpenStack installs a standalone instance of MongoDB to store metering data.

In order to perform mediation and rating, cloud service providers typically use a separate set of dedicated physical machines for the standalone installation of MongoDB. In case of significantly large data sizes, in a conventional approach, a distributed system, e.g., Hadoop Distributed File System (HDFS), is used for data processing. This conventional approach requires redistribution of metering data from the metering store to the HDFS system. This approach is burdensome because data ingestion into the HDFS system is known to be a major performance bottleneck, as well as "expensive" in terms of data copying. In contrast, embodiments of the invention provide an advantage in that that metering data is not redistributed from the metering store to another system. Instead, in one embodiment of the invention, metering data is collected in a distributed setup to begin with, which avoids extra copying and ingestion challenges and overheads associated with the conventional approach.

Another advantage of our framework is that it allows cloud service providers to offer not only the fine-grained metering information, but also customizable price plans, e.g., charging customers only on CPU utilization, etc. Furthermore, our approach can be extended to implement metering services for IaaS by: (i) launching the metering setup on physical nodes instead of VMs so that customers do not get access to the collected metered data; (ii) enabling monitoring of the physical nodes (within Ceilometer for example) for tracking infrastructure utilization per physical node instead of per VM; and (iii) updating the load balancer to effectively perform in heterogeneous environments so that cores not used by Nova, for example, can be used to launch metering services.

Figure 2A:
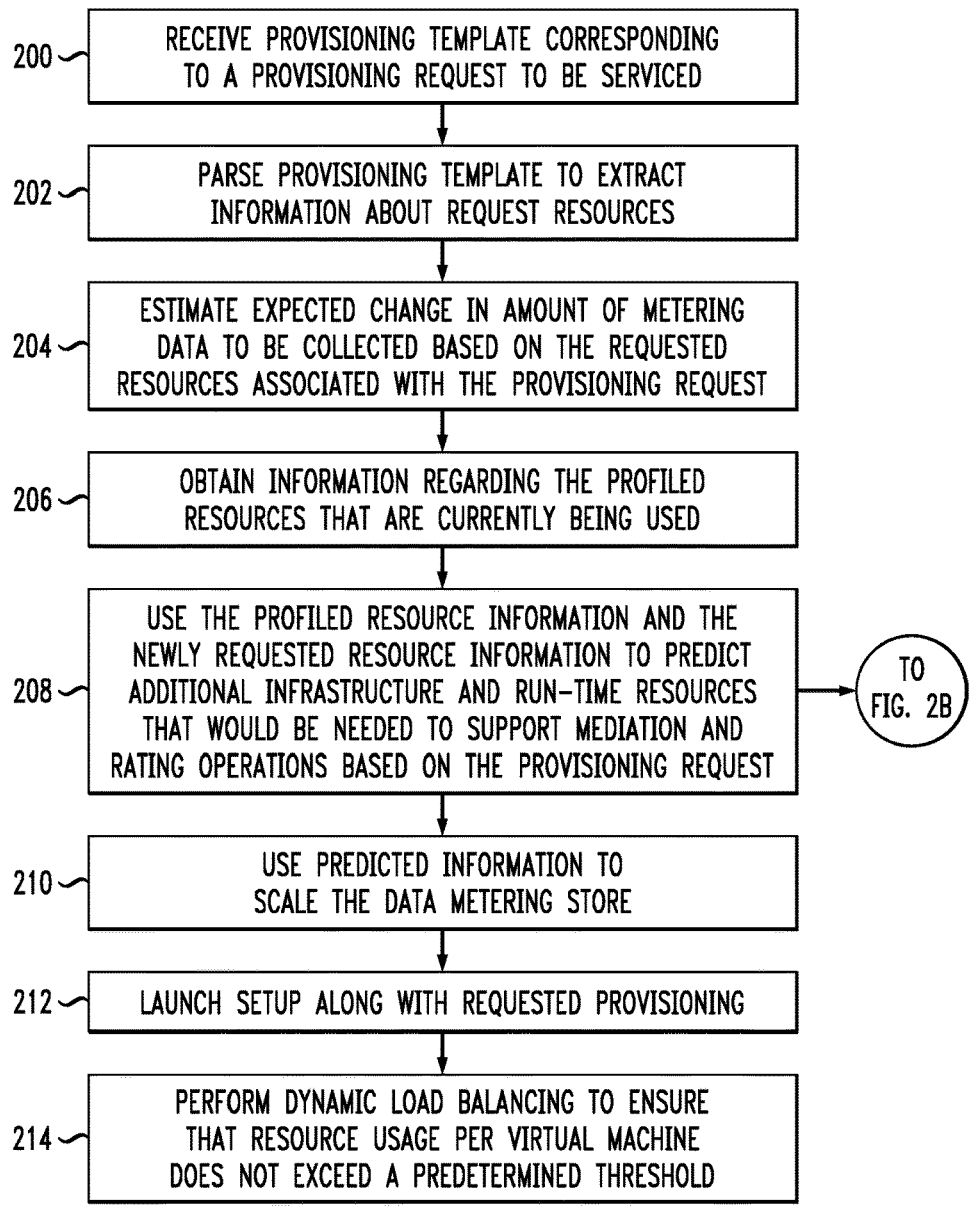
FIGS. 2A and 2B illustrate a flow diagram of a method for scalable service management in a computing platform, according to an embodiment of the invention.
Figure 2B:
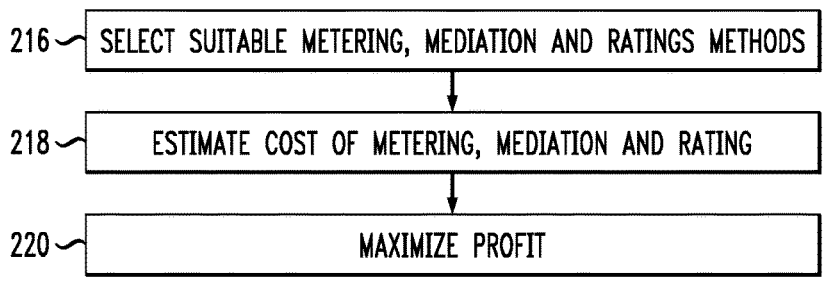

FIGS. 2A and 2B illustrate a flow diagram of a method for scalable service management of a cloud computing system, according to an embodiment of the invention. For purposes of illustration, the flow diagram of FIGS. 2A and 2B will be discussed with reference to the cloud computing system 100 of FIG. 1, wherein the method steps of FIGS. 2A and 2B illustrate various modes of operation of constituent components of the cloud computing system 100 of FIG. 1. In general, the service management system 102 of the cloud computing system 100 initiates a sequence of operations when servicing a provisioning request. As an initial step, the service management system 102 receives a provisioning template file 140 that corresponds to the provisioning request to be serviced (block 200). The provisioning template file 140 is input to the metering data size estimation module 106, wherein the provisioning template 140 is parsed to extract information about the requested resources associated with the new provisioning request (block 202).

The metering data size estimation module 106 uses the information about the requested resources to estimate an expected change in the amount of metering data that will need to be collected by the resource monitoring and metering system 110 based on the new provisioning request, which is to be stored in the scalable metering data store system 112 (block 204). Meanwhile, the resource profiling module 114 keeps track of the resources that are already in use, and maintains profiles of resource usage for mediation and rating purposes.

The resource prediction module 108 obtains information regarding the profiled resources that are currently in use (block 206), and then uses the profiled resource information and the newly requested resources information to predict (or estimate) additional infrastructure and run-time resources that would be needed to support mediation and rating operations based on the provisioning request (block 208). In one embodiment of the invention, the resource prediction module 108 calculates the resource requirements that are needed for a plurality of different mediation and rating techniques using a set of technique profiles (FIG. 10) that are generated using historical data. In another embodiment, the resource prediction module 108 calculates the resource requirements needed for collecting metering data.

The predictions made by the resource prediction module 108 are used to scale the metering data store (block 210). The resource prediction module 108 then communicates with the system controller 118 to initiate launching of the setup along with the requested provisioning (block 212) and to start mediation and rating of the provisioned service. The dynamic load balancing module 116 then performs a dynamic load balancing operation to ensure that resource use per virtual machine does not exceed a predetermined threshold (block 214) based on the newly provisioned resources. In one embodiment of the invention, the dynamic load balancing process of block 214 is implemented using a load balancing method as illustrated in FIG. 3.

In particular, FIG. 3 shows pseudo code of a load balancing method 300 according to an embodiment of the invention. In general, the load balancing method 300 of FIG. 3 comprises a block of pseudo code 302 that describes a REPLACE_VM function, and a block of pseudo code 304 that utilizes the REPLACE_VM function as part of a load balancing process to shift extra load on a given virtual machine due to mediation and rating functions to another virtual machine. The block of pseudo code 304 implements the following process for each resource r that is monitored by the resource profiling module 114. The resources include CPU, memory, and other hardware/software resources that the virtual machines may utilizes when executing on a given computing node of the cloud computing platform.

For each resource r, a virtual machine list rl is generated, which includes a list of all virtual machines that currently use the given resource r, wherein the virtual machines in the list rl are sorted by the amount of usage (from highest to lowest) of the given resource r. In addition, a threshold value t is initialized for the given resource r. Then, for each virtual machine vm in the list rl for the given resource r, a current load cl on the virtual machine vm is determined. The current load cl of a given virtual machine vm corresponds to the resource usage of that virtual machine as specified in the list rl. If the current load cl of a given virtual machine vm for the given resource r is less than the threshold value t of the given resource r, the load on the virtual machine vm is not reassigned. On the other hand, if the current load cl on the given virtual machine vm for the given resource r meets or exceeds the threshold value t, then an extra load el is determined as the current load less the threshold (i.e., cl−t). Then, a REPLACE_VM function is called to determine if there is a virtual machine in the list rl that is capable of handing the extra load, and the parameters vm, el, and r are passed to the REPLACE_VM function.

The REPLACE_VM function begins by reading the virtual machine list rl and the threshold value t for the given resource r. The virtual machine list rl is inverted such that the virtual machines in the list rl are sorted from lowest to highest of the amount of usage of the given resource r. Then, for a given virtual machine uvm in the inverted list rl, the parameter ucl is set as the current load on the virtual machine uvm for the given resource r. If the sum of ucl and el is less than or equal to t for the given resource r, then the given virtual machine uvm is deemed a candidate for having at least the extra load el reassigned thereto from the given overloaded virtual machine vm (or, in an alternate embodiment, having the entire load associated with mediation and rating (M/R load) assigned from the overloaded virtual machine vm to a new virtual machine uvm). But first, the threshold is checked for the other resources to determine if the candidate virtual machine uvm would be able to handle the extra load el, or entire M/R load, without exceeding the threshold for the other resources. If it is determined that the given candidate virtual machine uvm can handle the extra load (or entire M/R load), then the candidate virtual machine uvm is selected as the target virtual machine (i.e., a parameter use_this_vm is set to the index of the candidate virtual machine uvm) to which at least the extra load el, or the entire M/R load, will be reassigned.

On the other hand, if the sum of cl and el (for the given virtual machine uvm) is greater than t, then a null value 0 is assigned to the parameter use_this_vm, and the process is repeated to find a candidate virtual machine uvm that is capable of handling at least the extra load el, or the entire M/R load, of the overloaded virtual machine vm. After all virtual machines uvm in the inverted list rl are processed, if the parameter use_this_vm is still equal to 0, then is it determined that no virtual machine uvm in the inverted list rl is capable of handling at least the extra load el of the overloaded virtual machine vm. In this circumstance, a new virtual machine is launched to handle the extra load el, or entire M/R load, of the overloaded virtual machine vm. Finally, the extra load el, or the entire M/R load, is transferred from the overloaded virtual machine vm to the newly instantiated virtual machine.

In other embodiments of the invention, methods are proved to reduce the cost of service management associated with price plans and to balance the benefits of a usage-based revenue scheme, with the cost for providing such usage-based revenue scheme. FIG. 2B illustrates further methods to provide scalable service management in a computing platform with regard to dynamically selecting mediation and rating techniques to provide cost awareness in a usage-based revenue scheme, according to an embodiment of the invention. The process flow of FIG. 2B is performed offline, and is based, in part, on processing results of the offline resource prediction module 108 in block 208 of FIG. 2A.

As shown in FIG. 2B, a first step includes selecting suitable metering, mediation and rating techniques based the predicted infrastructure and run-time resources needed for a new provisioning request (bock 216). In one embodiment of the invention, the resource profiling module 114 maintains information regarding a plurality of mediation and rating techniques, wherein such information comprises resource requirements for the various techniques. For example, FIG. 10 illustrates profile information that is used to determine resource requirements for different mediation and rating methods, according to an embodiment of the invention. In particular, FIG. 10 is a table that lists different mediation and rating techniques, and associated information such as CPU types, CPU utilization, RAM size, RAM utilization, distributed linear scaling, storage, licensing costs, management cost, IT infrastructure cost, volume (S/M/L), etc., and other types of information associated with the different mediation and rating techniques, which can be tracked and maintained based on historical profile data. In this regard, the mediation and rating methods used are elastic and linearly scalable. When a given metering, mediation and rating method are implemented, the system can estimate and track the cost associated with metering, mediation and rating (block 218). Then, various optimization methods can be utilized to maximize profit (block 220).

As previously mentioned, some customers may prefer to be charged on fine grain level. As such, service providers need to collect metering data at a finer grain level (e.g., collecting data on an hourly basis or daily basis is finer grained than collecting data on a monthly basis). In this regard, service providers would need more resources not only to collect data but also to process the data. Accordingly, in one embodiment of the invention, systems and methods are provide to predict the metering, mediation and rating costs for various combinations of meters and allow service providers to choose the best suitable combinations of metering, mediation and rating so that the service providers can offer their customers these combinations as available price plans. In one embodiment, services providers can dynamically recommend the most profitable price plans and associated revenue tools, with their scalable deployment, on one hand, based on the business trend for usage pricing and, on the other hand, based on the need for system management resources as new customers subscribe to the service.

FIG. 11 illustrates a method for maximizing profit for different services (e.g., IaaS, PaaS, SaaS). In particular, FIG. 11 shows a set of meters used for the different services and the metering and cost operations that are performed at different granularity levels (e.g., monthly, weekly, daily, hourly). When calculations are performed on a monthly level (once per month), there is less operational cost to the service provider, but such price plan may have lower competitive advantage (with less customers interested). In one embodiment, the cost of performing metering, mediation and rating is performed at all granularity levels. Then, to compare one price plan with another, a constant coefficient can be utilized for adjusting competitive advantage.

In general, embodiments of the invention provide a framework for dynamically optimizing the cost of a service metering solution by (i) using metering templates automatically populated with current cost data (infrastructure, management, SLAs etc.) learned over recent historical data, (ii) calculating the metering technique for each metered item in order to optimize the service over all profit (price−cost), (iii) updating the price plan accordingly such that the metered data calculated above is used in price line items, and (iv) deploying scalable parallelized charge calculation based on the selected prices and rating schemas. In this regard, embodiments of the invention include automated systems for (i) selecting metering techniques for each service solution priced item, (ii) collecting cost data in pre-defined templates and where metering templates are dynamically updated across clouds and applications, (iii) inputting prices based on marketing evaluations, (iv) calculating the metering techniques selection as an optimization formulation, (v) parallel rate calculation for scalable cloud charge calculation, and (vi) generating a business model including package, price plan, SLA, release based, and variable price (spot instances).

EXPERIMENTAL SETUP AND RESULTS

We evaluated our framework on a test bed of 20 physical machines that were used to deploy 12 virtual machines within an OpenStack environment. Our analysis demonstrated that that service management related tasks can be offloaded to the existing virtual machines with at most 15% overhead in CPU utilization, 10% overhead for memory usage, and negligible overhead for I/O and network usage.

By dynamically scaling the setup, we were able to significantly reduce the metering data processing time without incurring any additional cost.

More specifically, we implemented a fine-grained metering approach according to the general system framework of FIG. 1 on top of OpenStack and MongoDB, wherein Python code was written to implement various modules including the resource profiling module 114, the offline resource prediction module 108 and various controller modules (e.g., the system controller 118). In particular, we deployed OpenStack release Icehouse version 2014.1.1 on 20 physical machines, where each machine had six cores and 32 GB of RAM. We varied the number of virtual machines from 3 to 12 to provide a SaaS. The metering data was collected from the virtual machines using a variable sampling interval. We tracked the usage of the virtual machines for a period of one month. We launched both default as well as customized meters to collect the resource usage. The following Table I shows the specifications for each virtual machine used for the experimentation.

TABLE I

| CPU | RAM (GB) | Write BW (MB/s) | Read BW (MB/s) | NW (MB/s) |
| --- | --- | --- | --- | --- |
| 8 Cores 3.0 GHz | 8 | 380 | 533 | 100 |

With regard to the scalable metering data store system 112, we performed tests using both a standalone as well as a scalable MongoDB setup. In our scalable setup, each replica set consisted of only one node that acted as a primary copy of the data. Furthermore, the replica sets were added as shards to scale the MongoDB deployment. For testing purposes, we launched three configuration servers and one query router that was deployed on the system controller VM 118. Each performance related experiment was performed on the actual collected metering data of more than 11 GB from the deployed OpenStack setup over the period of one month.

Figure 4:
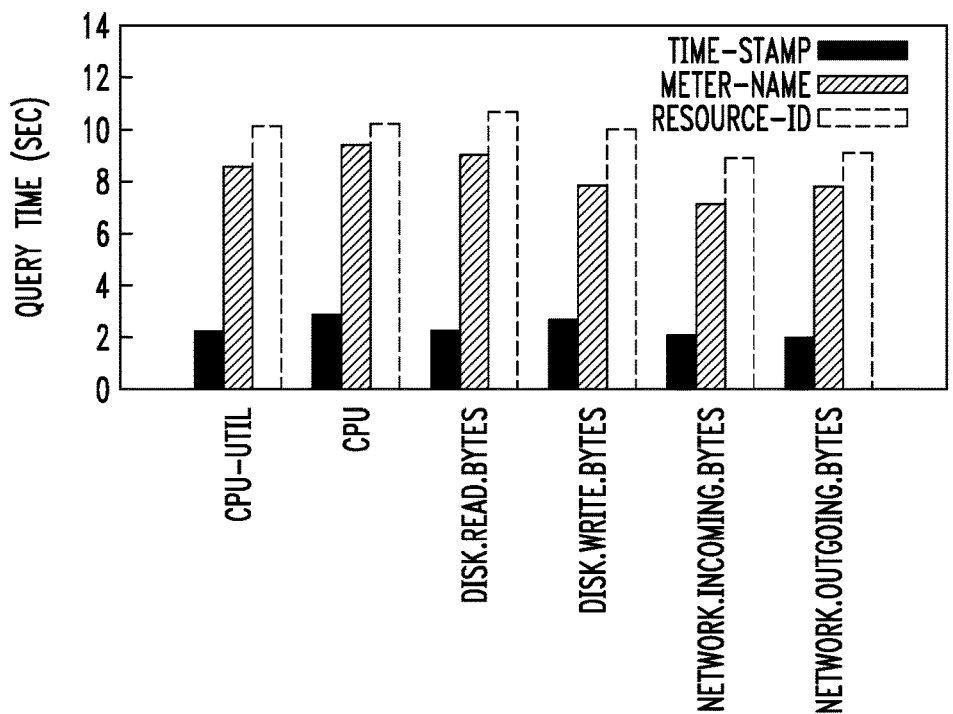
FIG. 4 graphically illustrates experimental results obtained for different metering events using different sharding keys on query times of an experimental metering data store system consisting of 4 shards, according to an embodiment of the invention.

With regard to sharding, we used different sharding keys for the Ceilometer database in our tests. FIG. 4 graphically illustrates experimental results obtained for different metering events from using different sharding keys on query timings for a MongoDB setup consisting of 4 shards. The metering events include cpu-util, cpu, disk.read.bytes, disk.write.bytes, network.incoming.bytes, and network.outgoing.bytes. The query calculated variance in utilization (standard deviation) of Ceilometer counters using MapReduce. From FIG. 4, it can be seen that the query time is affected more by the choice of the sharding key for the distributed setup as compared to the standalone setup.

Further investigation revealed that chunks greater than 64 MB were created in all cases except when timestamp of metering events was used as a shard key. This resulted in the MongoDB internal load balancer distributing chunks unevenly, with most of the chunks assigned to just one machine. This created a bottleneck and caused a significant increase in the query time. Consequently, a preferred sharding key to use in the target environment is timestamp, instead of counter name, user-id or resource-id.

Figure 5:
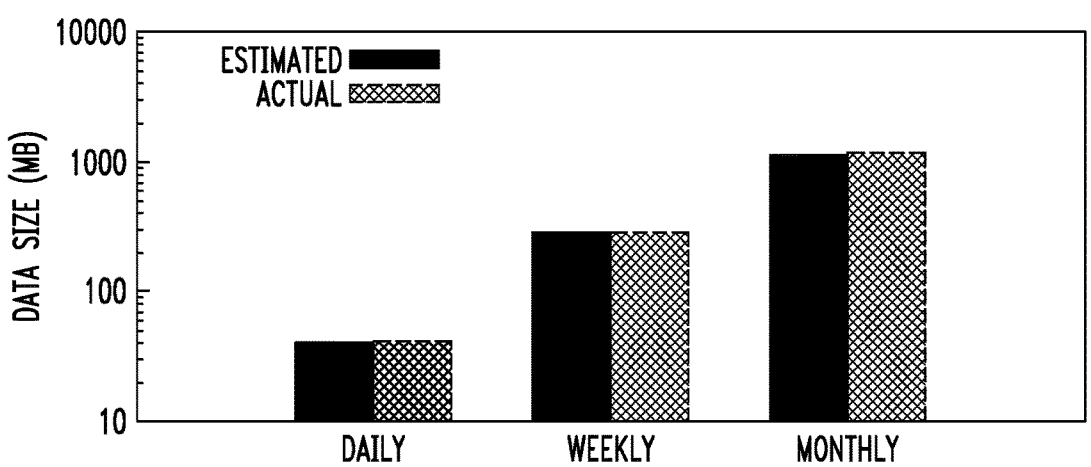
FIG. 5 graphically illustrates experimental results which show a comparison between an amount of metering data that was estimated using an experimental metering data size estimation module and an actual amount of collected metering data, according to an embodiment of the invention.

With regard to the functionality of the metering data size estimation, FIG. 5 graphically compares a data size of metering data estimated by the metering data size estimation module 106 and the actual collected metering data. In our first experiment, we compared the estimated and actual collected metering data size associated with the 12 virtual machines launched within the OpenStack deployment with a default set of meters. FIG. 5 shows the results. The framework predicted that 254 events would be collected from the virtual machine every 10 minutes. The estimated average event object size was 1150 bytes, 1134 bytes, and 1188 bytes for per day, per week and per month calculations, respectively. As seen in FIG. 5, compared to the actual observed values, the metering data size estimation module predicted metering data sizes with 995 accuracy.

Figure 6:
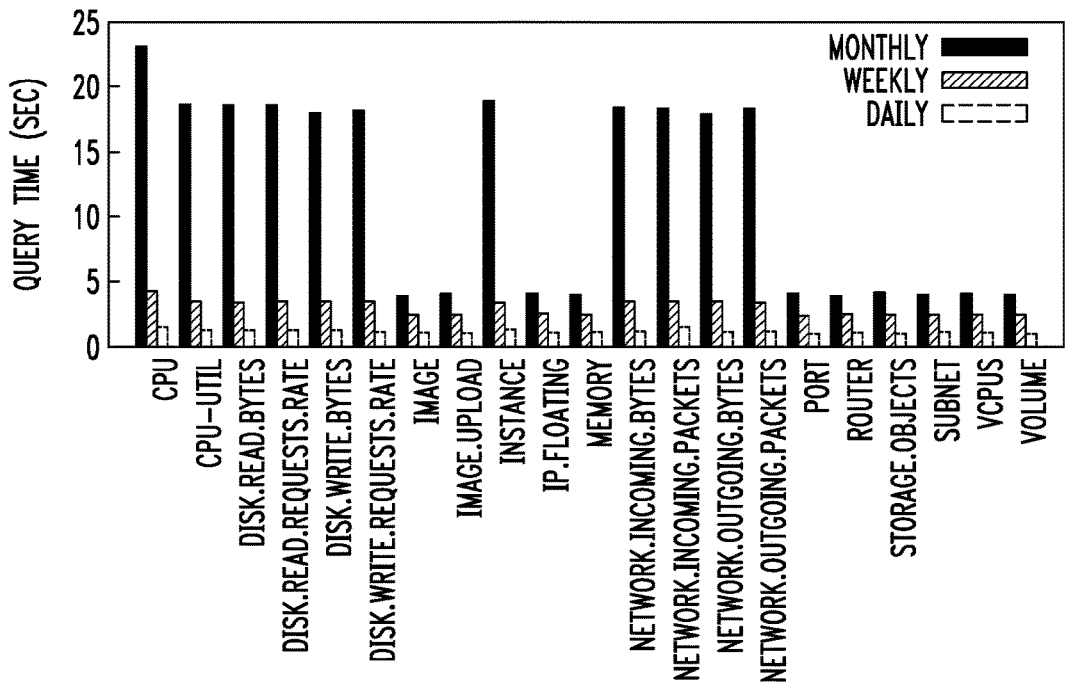
FIG. 6 graphically illustrates experimental results which show a comparison between query times at different granularity levels for various meters when processing user level data, according to an embodiment of the invention.

Next, with regard to resource profiling, we measured the effect of performing mediation at different granularity levels. FIG. 6 graphically illustrates experimental results of a comparison between query times at different granularity levels for various meters when processing user level data. The meters in FIG. 6 include cpu, cpu-util, disk.read.bytes, disk.read.requests.rate, disk.write.bytes, disk.write.requests sate, image, image.upload, instance, ip.floating, memory, network.incoming.bytes, network.incoming.packets, network.outgoing.bytes, network.outgoing.packets, port, router, storage.objects, subnet, vcpus, and volume. FIG. 6 graphically illustrates the time taken to perform mediation on the data of a single user using the statistics API provided by Ceilometer. We measured Maximum, Minimum, Average, Sum, and Count for the considered meters at three different granularity levels, namely, daily, weekly, and monthly. The results reveal that the meters that collect samples continuously at a fixed sampling interval took 4× to 6× more time to perform mediation on one month's data compared to one week's data. A similar "linear scaling" trend was observed when we compared the mediation time taken to process one week of data and one day of data.

Figure 7:
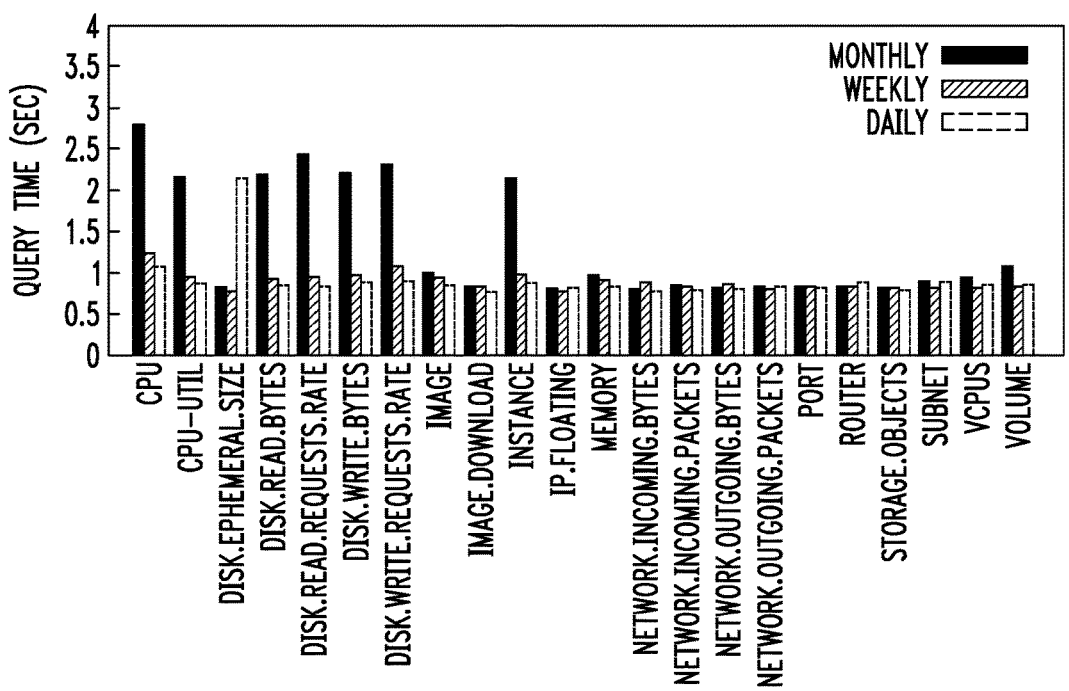
FIG. 7 graphically illustrates experimental results which show a comparison between query times at different granularity levels for the same meters in FIG. 6, when processing resource level data, according to an embodiment of the invention.

Next, we repeated the experiment using a single virtual machine under different metering data volumes. FIG. 7 graphically illustrates a difference in mediation time under different observed cases. In particular, FIG. 7 compares query times at different granularity levels for the same meters in FIG. 6, when processing resource (e.g., one virtual machine) level data. Once again, a linear scaling is observed for our approach.

Next, we measured the increase in average resource utilization per virtual machine due to mediation. The experimental results demonstrated that CPU utilization in the observed virtual machines did not increase above 15%. Similarly, an increase in memory utilization was observed to be less than 10%. Since the needed data is already distributed to the various virtual machines, the mediation process was expected to generate reads but not writes. This was confirmed by observed I/O usage, wherein the observed written data was substantially zero and wherein the average data read was low. Another key observation was that due to most of the computation being performed locally, the network usage was also negligible. The experimental results in this regard validate our claim that, if handled properly as in our approach, existing virtual machines can be used to perform mediation and rating tasks without affecting overall performance of the provided SaaS.

Figure 8:
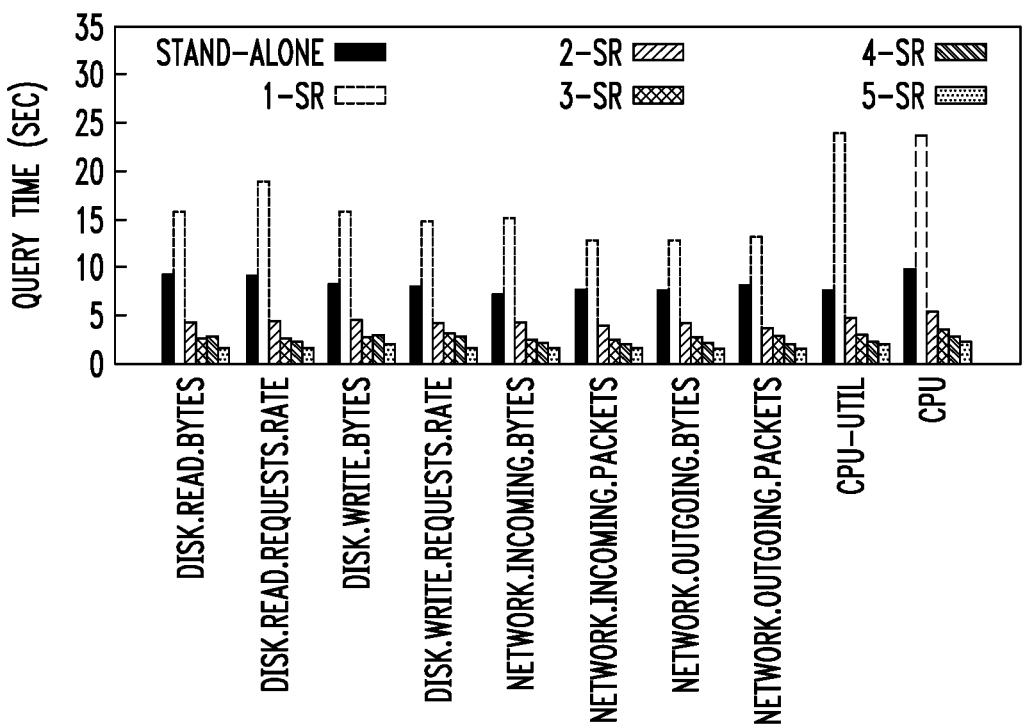
FIG. 8 graphically illustrates experimental results which show an impact on execution times of a query to calculate variance in utilization of various counters when scaling an experimental metering store, according to an embodiment of the invention.

With regard to the experimental scalable metering data store setup, we analyzed the effect of scaling our metering store, i.e., the distributed MongoDB setup, on mediation time. FIG. 8 graphically illustrates experimental results with regard the impact on execution time of a query to calculate variance in utilization of various counters as the metering store is scaled In particular, FIG. 8 illustrates a reduction in time to calculate variance in utilization (standard deviation) of various Ceilometer meters using MongoDB's MapReduce functionality, as we scaled up the metering store (the meters including disk.read.bytes, disk.read.requests.rate, disk.write.bytes, disk.write.requests.rate, network.incoming.bytes, network.incoming.packets, network.outgoing.bytes, betwork.outgoing.packets, cpu-util, and cpu). In FIG. 8, "sr" denotes a number of sharded replica sets used.

From FIG. 8, we see that the stand-alone installation of MongoDB performs better than the single shard distributed MongoDB setup—this is because of the networking overhead. However, as we increase the number of shards, the mediation time reduces. For the case of two replica sets acting as shards, the average query time is half the query time of the stand-alone setup. A further increase in the number of shards results in increasingly better performance in terms of query time. We also observed that the reduction in the query time is not linear and after reaching a certain threshold, the networking overhead actually causes performance degradation.

Figure 9:
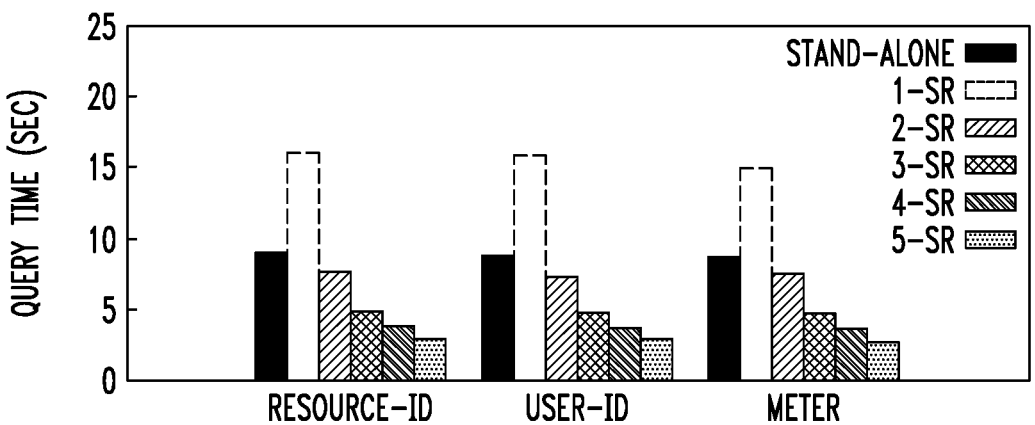
FIG. 9 graphically illustrates experimental results which show an impact of scaling of an experimental data metering store on query execution time when calculating Average, Sum, Maximum, and Minimum parameters using an aggregation function for different levels, according to an embodiment of the invention.

FIG. 9 graphically illustrates experimental results that show a comparison of query times to calculate Average, Sum, Maximum, and Minimum using an aggregation functionality provided by MongoDB. In particular, FIG. 9 shows the impact of scaling MongoDB on query execution time when calculating Average, Sum, Maximum, and Minimum using an aggregation for different levels, where "sr" represents a number of sharded replica sets used. Here, a more linear trend was observed when performing mediation using the aggregation.

Next, with regard to scaling and load balancing, we analyzed the effects of scaling the experimental setup and the role of load balancing. The following Table II shows the time taken to scale the metering store, total number of chunks transferred and chunks transferred per shard.

TABLE II

| Scaling from x to y Shards | Scaling Time (minutes) | Total Chunks Transferred | Chunks Transferred Per Shard |
|---|---|---|---|
| 1 to 2 | 10 | 93 | 93 |
| 2 to 3 | 6 | 62 | 31 |
| 3 to 4 | 3.5 | 47 | 15 |
| 4 to 5 | 2 | 37 | 9 |

By default, MongoDB only transfers one chunk at a time, which slows down the transferring process. The values shown in Table II illustrate that the transfer time should be taken into consideration when making setup scaling decisions. Furthermore, transferring chunks while scaling the setup also requires additional resources and adds an observable overhead to the virtual machines. This overhead was observed from the experimental results when scaling from one to five shards, in terms of resource usage per virtual machine for both a primary virtual machine i.e., the source of a chunk transfer, and a secondary virtual machine, i.e., destination of the chunk. We observed that while CPU utilization is high on the primary virtual machine, such utilization never exceeded 10% of that before the chunk transfer. Similarly, it was observed that memory utilization remained constant for the primary virtual machines, but increased by 5% to 10% for the secondary virtual machine compared to the pre-transfer usage.

It was further observed that the amount of data written in both the primary and secondary virtual machines remained almost unaffected, although high spikes of up to 2 MB/s were observed in the write I/Os. In contrast, the read I/O was observed to be higher for the primary virtual machine as compared to the secondary virtual machine. Moreover, the average write rate on the primary virtual machine was observed to be 0.5 MB/s whereas the average write rate for the secondary virtual machine was observed to be 0.4 MB/s. Similarly, the primary virtual machine showed a higher network transmission rate as compared to the secondary virtual machine which showed a higher reception rate. However, in both cases, the network transmission and reception rates stayed below 20 MB/s.

In summary, we have evaluated the performance of our approach in providing a scalable and flexible metering and rating system for cloud-based SaaS. Our results show that embodiments of systems and methods as described herein for scalable metering have small impact on the co-located SaaS while providing for dynamic scaling. The key features of our framework will allow cloud service providers to scale their revenue systems in a cost-aware manner. Our approach is designed for scalable deployment and is unique in that it uses existing VMs to perform service management operations (e.g., mediation and/or rating) for managing a cloud computing platform, and only launches additional VMs, when necessary, thus incurring little additional cost. Indeed, mechanisms are provided to profile and predict the resources required for supporting mediation and rating in cloud applications, for example, whereby we predict the additional load that can be added to the existing VMs that are already loaded. We perform load balancing by placing/shifting only a specific (small) part of the overall load to ensure compliance with SLAs. Our monitoring system collects and stores the metering data in distributed database, which implements the ability to scale the setup and use existing virtual machines, to provide a scalable and flexible metering and rating system for the SaaS applications in a cloud computing system, and provide a system for cloud service providers to scale their revenue management systems in a cost-aware manner.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

These concepts are illustrated with reference to FIG. 12, which shows a computing node 10 comprising a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

Figure 12:
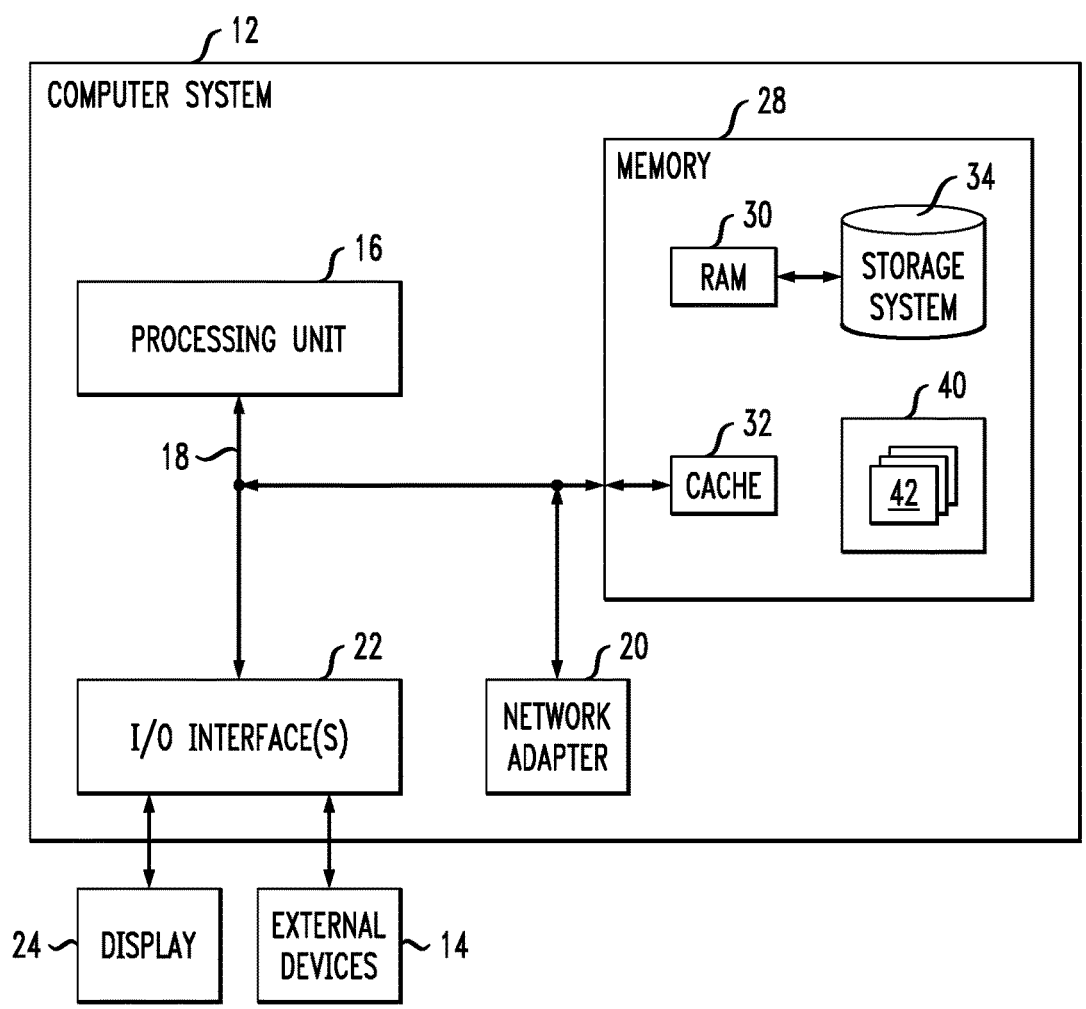
FIG. 12 illustrates a computer system that may be used to implement one or more components/steps of the techniques of the invention, according to an embodiment of the invention.

In FIG. 12, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

The bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 12 typically includes a variety of computer system readable media. Such media may be any available media that is accessible by computer system/server 12, and it includes both volatile and non-volatile media, removable and non-removable media.

The system memory 28 can include computer system readable media in the form of volatile memory, such as random access memory (RAM) 30 and/or cache memory 32. The computer system/server 12 may further include other removable/non-removable, volatile/nonvolatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As depicted and described herein, memory 28 may include at least one program product having a set (e.g., at least one) of program modules that are configured to carry out the functions of embodiments of the invention.

The program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc., one or more devices that enable a user to interact with computer system/server 12, and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain embodiments of the embodiments, the practical application or technical improvement over technologies found in the marketplace, or to enable others of ordinary skill in the art to understand the embodiments disclosed herein.

What is claimed is:

1. A method for managing a computing platform, comprising:
    provisioning a plurality of virtual machines across a plurality of computing nodes of a computing platform;
    executing service workloads using the provisioned virtual machines to provide one or more services to clients;
    dynamically configuring one or more of the provisioned virtual machines on a given computing node of the plurality of computing nodes to serve as a centralized agent that is configured to collect management data from each of the plurality of computing nodes of the computing platform to support a telemetry service of the computing platform;
    wherein the management data collected by the centralized agent comprises resource usage data of resources utilized by the provisioned virtual machines executing the service workloads across the plurality of computing nodes;
    providing, by the centralized agent, the collected management data to a service management system of the computing platform; and
    utilizing, by the service management system, the management data provided by the centralized agent to perform service management operations for managing the computing platform;
    wherein the provisioning, dynamically configuring, providing, and utilizing steps are implemented at least in part by one or more processors executing program code.

2. The method of claim 1, wherein the service management operations for managing the computing platform comprise mediation and rating operations for revenue management of the computing platform.

3. The method of claim 1, wherein utilizing the management data to perform service management operations for managing the computing platform, comprises:
    utilizing the management data to generate resource profiles of the provisioned virtual machines, wherein the resource profile of a given provisioned virtual machine indicates a current resource utilization of the given provisioned virtual machine; and
    dynamically balancing the workload of the provisioned virtual machines so that the resource utilization by each of the provisioned virtual machines does not exceed a predetermined resource utilization threshold.

4. The method of claim 3, wherein utilizing the management data to generate resource profiles of the provisioned virtual machines comprises:
    applying a sliding window over a previous number (n) of data samples of resource usage of a given provisioned virtual machine to compute a moving average; and
    using the computed moving average as an estimate of the current resource utilization of the given provisioned virtual machine.

5. The method of claim 3, wherein dynamically balancing the workload of the provisioned virtual machines comprises provisioning at least one additional virtual machine in at least one computing node to handle an extra workload, if no currently provisioned virtual machine is capable of handing the extra workload.

6. The method of claim 1, further comprising:
receiving, by the computing platform, a new provisioning request; and
determining an expected change in an amount of management data to be collected based on requested resources associated with the new provisioning request; and
scaling a data store system based on the determined expected change in the amount of management data.

7. The method of claim 6, further comprising performing an offline analysis to predict a set of resources that would be needed to service the new provisioning request, wherein the offline analysis is performed using (i) the determined expected change in the amount of management data and (ii) resource profiles of the provisioned virtual machines, wherein a resource profile of given provisioned virtual machine indicates a current resource utilization of the given provisioned virtual machine.

8. The method of claim 7, wherein the predicted set of resources include resources that would be needed for the provisioned virtual machines to perform service workloads associated with the new provisioning request.

9. The method of claim 7, wherein the predicted set of resources include resources that would be needed for the provisioned virtual machines which serve as the centralized agent to perform workloads associated with collecting the management data.

10. A computer program product comprising a non-transitory computer readable storage medium having program instructions embodied therewith, the program instructions executable by a computer to cause the computer to perform a method for managing a computing platform, the method comprising:
provisioning a plurality of virtual machines across a plurality of computing nodes of a computing platform;
executing service workloads using the provisioned virtual machines to provide one or more services to clients;
dynamically configuring one or more of the provisioned virtual machines on a given computing node of the plurality of computing nodes to serve as a centralized agent that is configured to collect management data from each of the plurality of computing nodes of the computing platform to support a telemetry service of the computing platform;
wherein the management data collected by the centralized agent comprises resource usage data of resources utilized by the provisioned virtual machines executing the service workloads across the plurality of computing nodes;
providing, by the centralized agent, the collected management data to a service management system of the computing platform; and
utilizing, by the service management system, the management data provided by the centralized agent to perform service management operations for managing the computing platform.

11. The computer program product of claim 10, wherein the service management operations for managing the computing platform comprise mediation and rating operations for revenue management of the computing platform.

12. The computer program product of claim 10, wherein the executable program instructions for utilizing the management data to perform service management operations for managing the computing platform, comprise executable program instructions for:
utilizing the management data to generate resource profiles of the provisioned virtual machines, wherein the resource profile of a given provisioned virtual machine indicates a current resource utilization of the given provisioned virtual machine; and
dynamically balancing the workload associated with the service management operations of the provisioned virtual machines so that the resource utilization by each of the provisioned virtual machines does not exceed a predetermined resource utilization threshold.

13. The computer program product of claim 10, further comprising executable program instructions for:
receiving, by the computing platform, a new provisioning request; and
determining an expected change in an amount of management data to be collected based on requested resources associated with the new provisioning request; and
scaling a data store system based on the determined expected change in the amount of management data.

14. The computer program product of claim 13, further comprising executable program instruction for performing an offline analysis to predict a set of resources that would be needed to service the new provisioning request, wherein the offline analysis is performed using (i) the determined expected change in the amount of management data and (ii) resource profiles of the provisioned virtual machines, wherein a resource profile of given provisioned virtual machine indicates a current resource utilization of the given provisioned virtual machine.

15. A computing system, comprising:
a plurality of computing nodes, each comprising a plurality of computing resources including memory and processors,
wherein a plurality of virtual machines are provisioned across the plurality of computing nodes, wherein the provisioned virtual machines are configured to execute service workloads to provide one or more services to customers; and
wherein one or more of the provisioned virtual machines on a given computing node of the plurality of computing nodes are dynamically configured to serve as a centralized agent that collects management data from each of the plurality of computing nodes of the computing platform to support a telemetry service of the computing platform;
wherein the management data collected by the centralized agent comprises resource usage data of resources utilized by the provisioned virtual machines executing the service workloads across the plurality of computing nodes;
wherein the centralized agent provides the collected management data to a service management system of the computing system; and
wherein the management data is utilized by the service management system of the computing system to perform service management operations for managing the computing system.

16. The system of claim 15, wherein the service management operations for managing the computing platform comprise mediation and rating operations for revenue management of the computing platform.

17. The system of claim 15, wherein the service management system comprises:
a resource monitoring and metering system that is configured to receive and process the management data collected by the centralized agent
a resource profiling system configured to utilize the management data to generate resource profiles of the provisioned virtual machines, wherein the resource profile of a given provisioned virtual machine indicates a current resource utilization of the given provisioned virtual machine; and a load balancing system configured to dynamically balance the workload associated with the service management operations of the provisioned virtual machines so that the resource utilization by each of the provisioned virtual machines does not exceed a predetermined resource utilization threshold.

18. The system of claim 15, wherein the service management system comprises:

a management data size estimation system configured to receive a new provisioning request, and determine an expected change in an amount of management data to be collected based on requested resources associated with the new provisioning request; and a scalable data store system configured to scale a data store based on the determined expected change in the amount of management data.

19. The computer program product of claim 12, wherein the executable program instructions for utilizing the management data to generate resource profiles of the provisioned virtual machines comprise executable program instructions for:

applying a sliding window over a previous number (n) of data samples of resource usage of a given provisioned virtual machine to compute a moving average; and using the computed moving average as an estimate of the current resource utilization of the given provisioned virtual machine.

20. The system of claim 17, wherein the resource profiling system is configured to utilize the management data to generate resource profiles of the provisioned virtual machines by applying a sliding window over a previous number (n) of data samples of resource usage of a given provisioned virtual machine to compute a moving average, and using the computed moving average as an estimate of the current resource utilization of the given provisioned virtual machine.

* * * * *